(12) United States Patent
Nishino et al.

(10) Patent No.: US 11,787,363 B2
(45) Date of Patent: Oct. 17, 2023

(54) WEBBING TAKE-UP DEVICE

(71) Applicant: KABUSHIKI KAISHA TOKAI-RIKA-DENKI-SEISAKUSHO, Aichi (JP)

(72) Inventors: Atsushi Nishino, Aichi (JP); Takuhiro Saito, Aichi (JP); Kazuhiro Yamada, Aichi (JP); Chihiro Matsuoka, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 352 days.

(21) Appl. No.: 17/279,985

(22) PCT Filed: Sep. 24, 2019

(86) PCT No.: PCT/JP2019/037222
§ 371 (c)(1),
(2) Date: Mar. 25, 2021

(87) PCT Pub. No.: WO2020/066990
PCT Pub. Date: Apr. 2, 2020

(65) Prior Publication Data
US 2021/0394708 A1 Dec. 23, 2021

(30) Foreign Application Priority Data
Sep. 27, 2018 (JP) ................. 2018-181197

(51) Int. Cl.
*B60R 22/38* (2006.01)
*B60R 22/343* (2006.01)
*B60R 22/48* (2006.01)

(52) U.S. Cl.
CPC ............ *B60R 22/38* (2013.01); *B60R 22/343* (2013.01); *B60R 22/48* (2013.01); *B60R 2022/4825* (2013.01)

(58) Field of Classification Search
CPC ....... B60R 22/38; B60R 22/48; B60R 22/343; B60R 22/3413; B60R 22/4633
See application file for complete search history.

(56) References Cited

U.S. PATENT DOCUMENTS 6,354,528 B1 * 3/2002 Nagata ................ B60R 22/4633
242/383.2
2003/0209624 A1 11/2003 Biller
(Continued)

FOREIGN PATENT DOCUMENTS

JP 2003-327077 A 11/2003
JP 2013-139161 A 7/2013
(Continued)

*Primary Examiner* — Sang K Kim
(74) *Attorney, Agent, or Firm* — Thomas W. Cole; Calderon Safran & Cole P.C.

(57) ABSTRACT

In a vehicle emergency, a spool of a webbing take-up device is rotated in a pull-out direction such that a main lock is displaced toward a rotation-radial direction outside of the spool and engages with a clutch gear configuring a first rotation body. Rotation of the spool in the pull-out direction is thus restricted. Also in a vehicle emergency, the first rotation body is rotated in a take-up direction of the spool such that the main lock engages with the first rotation body, and rotation force of the first rotation body is transmitted to the spool through the main lock and the spool is rotated in the take-up direction.

10 Claims, 6 Drawing Sheets

(56) References Cited

U.S. PATENT DOCUMENTS

| | | | | |
|---|---|---|---|---|
| 2011/0290929 A1* | 12/2011 | Tatsuma | ................ | B60R 22/38 |
| | | | | 242/383.2 |
| 2011/0290930 A1* | 12/2011 | Tatsuma | ................ | B60R 22/38 |
| | | | | 242/383.2 |
| 2011/0309179 A1* | 12/2011 | Yanagawa | ............... | B60R 22/38 |
| | | | | 242/374 |
| 2011/0315805 A1* | 12/2011 | Yanagawa | ............... | B60R 22/38 |
| | | | | 242/382 |
| 2012/0175451 A1* | 7/2012 | Yanagawa | .......... | B60R 22/3413 |
| | | | | 242/379.1 |
| 2018/0037192 A1 | 2/2018 | Yanagawa et al. | | |

FOREIGN PATENT DOCUMENTS

| | | |
|---|---|---|
| JP | 2014-201122 A | 10/2014 |
| JP | 2016-164057 A | 9/2016 |

\* cited by examiner

WEBBING TAKE-UP DEVICE

CROSS-REFERENCE TO RELATED APPLICATIONS

The present application is a U.S. National Phase of PCT/JP2019/037222 filed on Sep. 24, 2019, claiming priority under 35 USC 119 from Japanese Patent Application No. 2018-181197 filed Sep. 27, 2018, the disclosure of which is incorporated by reference herein.

TECHNICAL FIELD

The present invention relates to a webbing take-up device.

BACKGROUND ART

Japanese Patent Application Laid-Open (JP-A) No. 2003-327077 discloses a webbing take-up device in which in a vehicle emergency, pull-out of webbing (belt web) from a spool (belt spool) is limited and the spool is made to rotate in a take-up direction.

The webbing take-up device disclosed in JP-A No. 2003-327077 includes a coupling pawl attached to the spool and a drive wheel disposed at a radial direction outside of the coupling pawl. The coupling pawl engages with the drive wheel in a vehicle emergency so as to limit pull-out of the webbing from the spool. In a state in which the coupling pawl has engaged with the drive wheel, the drive wheel is rotated so as to rotate the spool in the take-up direction and take up the webbing onto the spool.

SUMMARY OF INVENTION

Technical Problem

However, in this webbing take-up device, a mechanical sensor or electromagnet is used to actuate the coupling pawl and make the coupling pawl engage with the drive wheel by.

In consideration of the above circumstances, an object of the present invention is to obtain a webbing take-up device capable utilizing relative rotation between a spool and a first rotation body to make a lock section engage with the first rotation body.

Solution to Problem

A webbing take-up device according to a first aspect includes a spool that is rotated in a take-up direction to take up webbing for fitting over an occupant, and that is rotated in a pull-out direction when the webbing is pulled out, a first rotation body that is capable of transmitting rotation force, and a lock section that is provided so as to be capable of rotating integrally with the spool, and that is capable of engaging with the first rotation body. The webbing take-up device is configured such that in a vehicle emergency, the spool is rotated in the pull-out direction and the lock section engages with the first rotation body that has been held fast so as to restrict rotation of the spool in the pull-out direction, and in a vehicle emergency, the first rotation body is rotated in the take-up direction of the spool and the lock section engages with the first rotation body such that rotation force of the first rotation body is transmitted to the spool through the lock section and the spool is rotated in the take-up direction.

A webbing take-up device according to a second aspect is the webbing take-up device of the first aspect, further including a second rotation body that is disposed at a rotation-radial direction inside of the first rotation body such that part of the lock section engages with the second rotation body, wherein the first rotation body is provided so as to be capable of being rotated coaxially to a rotation axis of the spool by a motor, the lock section is disposed at the rotation-radial direction inside of the first rotation body and is capable of undergoing displacement toward the rotation-radial direction outside of the spool, in a vehicle emergency, the second rotation body engages with the first rotation body and the spool is rotated in the pull-out direction with respect to the second rotation body such that the lock section is displaced toward the rotation-radial direction outside of the spool and engages with the first rotation body so as to restrict rotation of the spool in the pull-out direction, and in a vehicle emergency, the second rotation body engages with the first rotation body and the first rotation body is rotated in the take-up direction of the spool together with the second rotation body such that the lock section is displaced toward the rotation-radial direction outside of the spool and engages with the first rotation body such that rotation force of the first rotation body is transmitted to the spool through the lock section and the spool is rotated in the take-up direction.

A webbing take-up device according to a third aspect is the webbing take-up device of the second aspect, wherein the second rotation body includes a second rotation main body engaged with part of the lock section, and a pawl that is supported by the second rotation main body and that undergoes displacement so as to engage with the first rotation body, and the pawl is provided with part of an electromagnetic mechanism that is supplied with power in order to displace the pawl.

A webbing take-up device according to a fourth aspect is the webbing take-up device of the third aspect, wherein power supply to the electromagnetic mechanism is cut off in a state in which the lock section has engaged with the first rotation body.

A webbing take-up device according to a fifth aspect is the webbing take-up device of any one of the first aspect to the fourth aspect, wherein engagement between the lock section and the first rotation body is released by rotating the first rotation body in the pull-out direction of the spool.

Advantageous Effects of Invention

In the webbing take-up device according to the first aspect, when the spool is rotated in the take-up direction, the webbing is taken up onto the spool. Moreover, when the webbing is pulled out from the spool, the spool is rotated in the pull-out direction.

In a vehicle emergency, the spool is rotated in the pull-out direction such that the lock section engages with the first rotation body. Rotation of the spool in the pull-out direction is thus restricted.

Also in a vehicle emergency, the first rotation body is rotated in the take-up direction of the spool such that the lock section engages with the first rotation body. Rotation force of the first rotation body is therefore transmitted to the spool through the lock section, thereby rotating the spool in the take-up direction. The webbing is taken up onto the spool as a result.

In this manner, the lock section can be made to engage with the first rotation body by utilizing relative rotation between the spool and the first rotation body.

In the webbing take-up device according to the second aspect, in a vehicle emergency the second rotation body engages with the first rotation body. When the spool is rotated in the pull-out direction relative to the second rotation body, the lock section is displaced toward the rotation-radial direction outside of the spool and engages with the first rotation body. Rotation of the spool in the pull-out direction is thus restricted.

Also in a vehicle emergency, the second rotation body engages with the first rotation body. The first rotation body is rotated by the motor such that the first rotation body is rotated in the take-up direction of the spool together with the second rotation body, such that the lock section is displaced toward the rotation-radial direction outside of the spool and thus engages with the first rotation body. Rotation force of the first rotation body is therefore transmitted to the spool through the lock section, thereby rotating the spool in the take-up direction. The webbing is taken up onto the spool as a result.

In this manner, in the webbing take-up device according to the second aspect, the webbing can be taken up swiftly onto the spool in a vehicle emergency by making the second rotation body engage with the first rotation body and rotating the first rotation body. Moreover, by using the motor to rotate the first rotation body, the lock section engages with the first rotation body in a state in which the webbing has been taken up onto the spool. Namely, rotation of the spool in the pull-out direction is restricted. This enables the length of the webbing taken up onto the spool to be pulled out from the spool to be made shorter.

In the webbing take-up device according to the third aspect, power is supplied to the electromagnetic mechanism in a vehicle emergency. The pawl supported on the second rotation main body engages with the first rotation body as a result. The spool is then rotated in the pull-out direction such that the lock section undergoes displacement and engages with the first rotation body. Rotation of the spool in the pull-out direction is thus restricted.

Moreover, power is supplied to the electromagnetic mechanism in a vehicle emergency. The pawl supported on the second rotation main body engages with the first rotation body as a result. The first rotation body is then rotated in the take-up direction of the spool such that the lock section undergoes displacement so as to engage with the first rotation body. Rotation force of the first rotation body is thus transmitted to the spool through the lock section, rotating the spool in the take-up direction. The webbing is taken up onto the spool as a result.

Note that in the webbing take-up device according to the third aspect, the electromagnetic mechanism is supplied with power so as to make the pawl supported on the second rotation main body engage with the first rotation body. This enables the lock section to be made to engage with the first rotation body more rapidly than, for example, in cases in which a mechanical mechanism that utilizes friction or the like is employed to make a pawl engage with a first rotation body. This enables the webbing to be taken up swiftly onto the spool as a result, and enables the length of webbing taken up onto the spool to be pulled out from the spool to be made shorter.

In the webbing take-up device according to the fourth aspect, the power supply to the electromagnetic mechanism is cut off in a state in which the lock section has engaged with the first rotation body. This enables needless power supply to the electromagnetic mechanism used to make the lock section engage with the first rotation body to be suppressed.

In the webbing take-up device according to the fifth aspect, the engagement between the lock section and the first rotation body is released by rotating the first rotation body in the pull-out direction of the spool. This permits the webbing to be pulled out from the spool. Note that in the webbing take-up device according to fifth aspect, the engagement between the lock section and the first rotation body is released by rotating the first rotation body in the opposite direction (pull-out direction) to the direction in which the webbing is taken up onto the spool (take-up direction). Thus, after limiting pull-out of the webbing from the spool, the restriction on rotation of the spool in the pull-out direction can then be released without further constricting the body of an occupant with the webbing.

DESCRIPTION OF EMBODIMENTS

Explanation follows regarding a webbing take-up device according to an exemplary embodiment of the present invention, with reference to FIG. 1 to FIG. 6.

Figure 1:
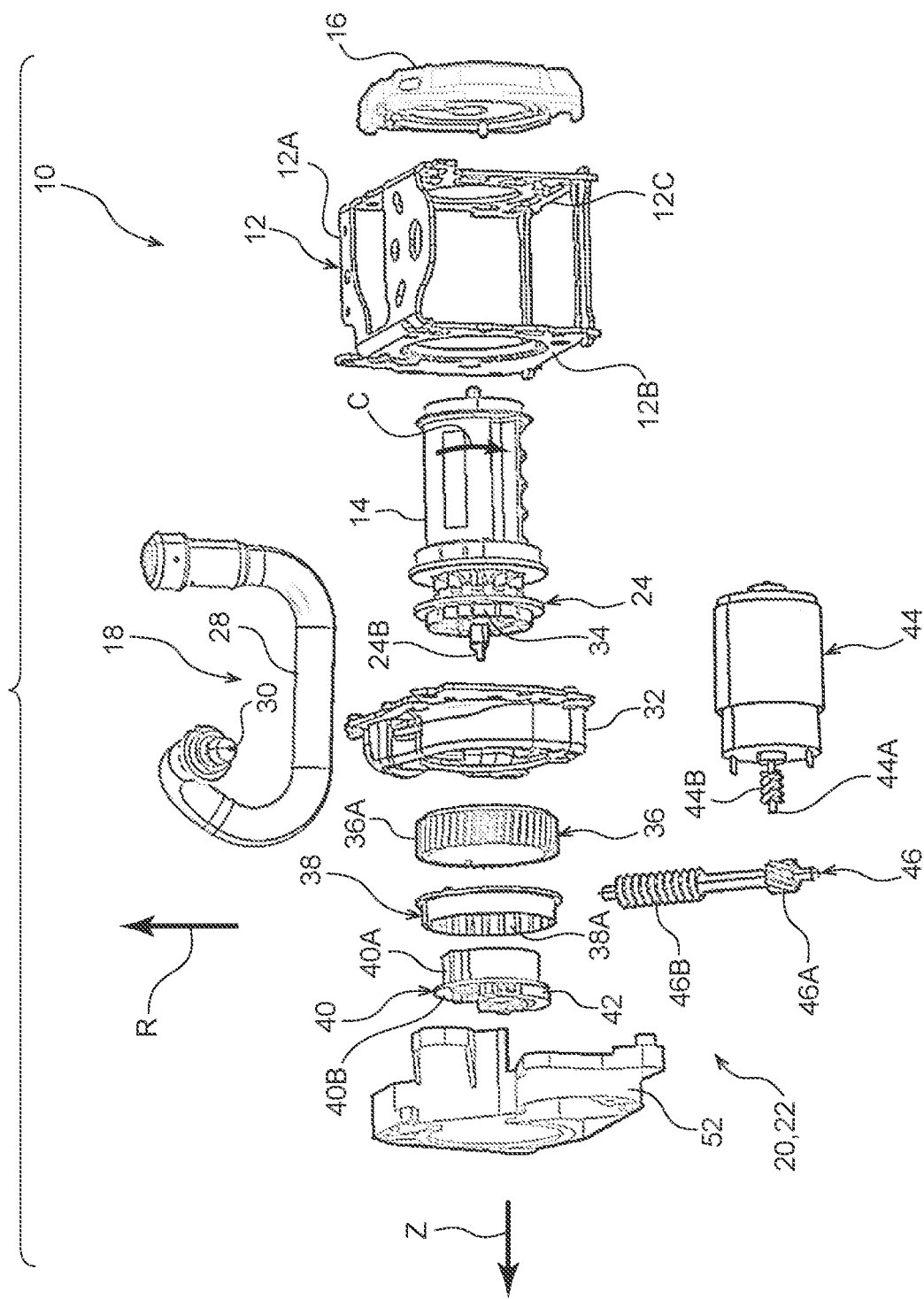
FIG. 1 is an exploded perspective view illustrating a webbing take-up device of an exemplary embodiment.

As illustrated in FIG. 1, a webbing take-up device 10 of the present exemplary embodiment includes a frame 12, a spool 14, non-illustrated webbing, a take-up biasing mechanism 16, a pre-tensioner mechanism 18, a pre-crash seatbelt mechanism 20 (hereafter simply referred to as the PSB mechanism 20), and a lock mechanism 22. Unless specifically stated otherwise, in the below explanation, reference to an axial direction, a radial direction, and a circumferential direction indicate a rotation-axial direction, a rotation-radial direction, and a rotation-circumferential direction of the spool 14.

The frame 12 includes a plate shaped back plate 12A for fixing to a vehicle body. Leg plates 12B, 12C extend at substantially right angles from both width direction (axial direction) end portions of the back plate 12A. The pre-tensioner mechanism 18, the lock mechanism 22, and the PSB mechanism 20, described later, are provided on the leg plate 12B side. The take-up biasing mechanism 16, described later, is provided on the leg plate 12C side.

The spool 14 is formed in a substantially circular tube shape, and is rotatably supported by the frame 12 between the leg plate 12B and the leg plate 12C of the frame 12. Note that a known torsion shaft, configuring a force limiter mechanism, is disposed inside the spool 14.

The webbing is fitted over the body of an occupant, and a base end portion configuring one length direction end portion of the webbing is anchored to the spool 14. Rotation of the spool 14 is biased in a take-up direction (the arrow C direction in FIG. 1, etc.), this being one rotation direction, by biasing force of a non-illustrated flat spiral spring configuring part of the take-up biasing mechanism 16. When the spool 14 is rotated in the take-up direction, the webbing is taken up onto the spool 14 from its base end side. When the webbing is pulled out from the spool 14, the spool 14 is rotated in a pull-out direction (the opposite direction to the arrow C direction in FIG. 1 etc.), this corresponding to another rotation direction.

The pre-tensioner mechanism 18 includes a moving member engagement section 24 that is provided alongside one axial direction side (arrow Z direction side) end portion of the spool 14 and that is joined to the spool 14 through the non-illustrated torsion shaft. The pre-tensioner mechanism 18 also includes a moving member 30 that is moved when gas generated by a gas generation device 26 is supplied into a cylinder 28. The pre-tensioner mechanism 18 further includes a cover base 32 that is attached to the leg plate 12B of the frame 12 and that covers the moving member engagement section 24. When the moving member 30 moves from inside the cylinder 28 to inside the cover base 32 so as to engage with the moving member engagement section 24, the moving member engagement section 24 is rotated in the take-up direction, such that the spool 14 is also rotated in the take-up direction and the webbing is taken up onto the spool 14. Note that the pre-tensioner mechanism 18 is configured to actuate in a vehicle collision (in a head-on collision).

Next, explanation follows regarding the lock mechanism 22 and the PSB mechanism 20, these being relevant portions of the present exemplary embodiment.

Figure 2:
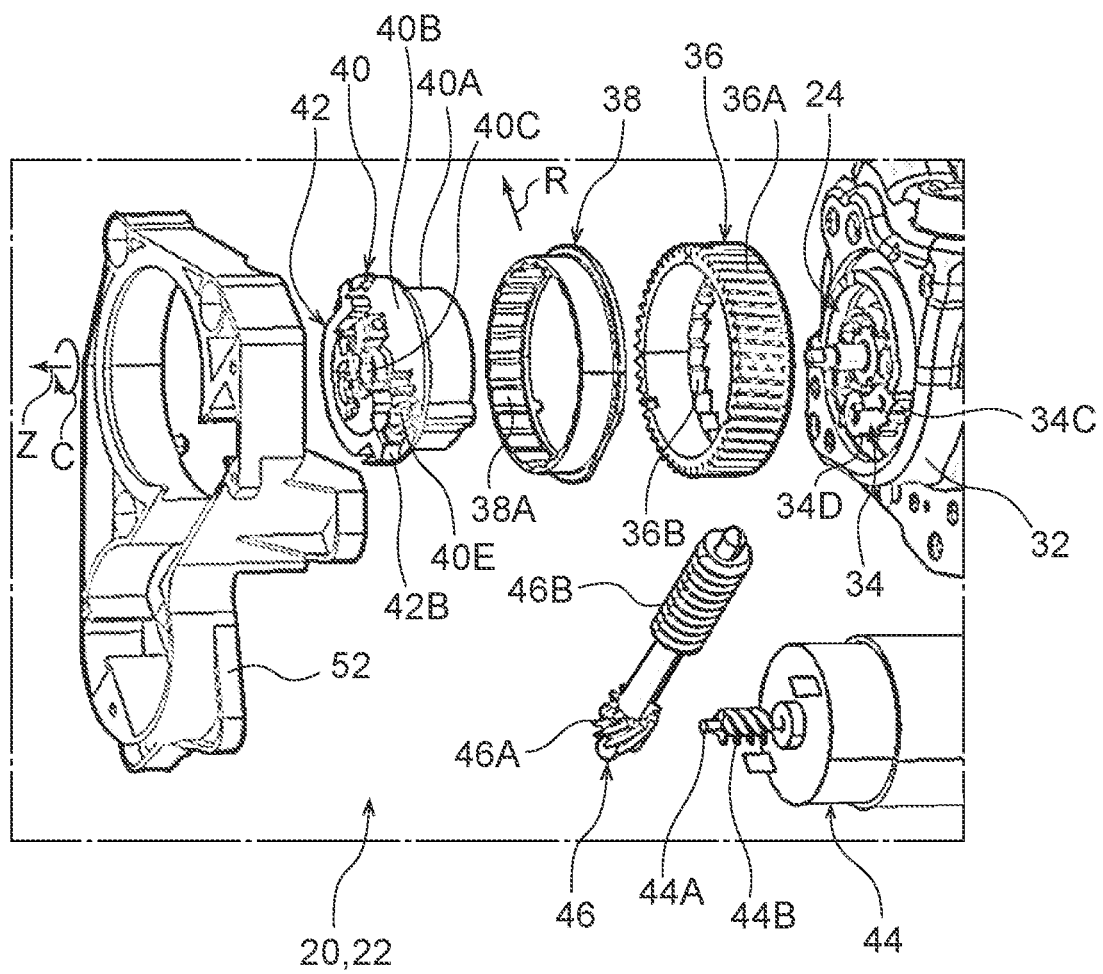
FIG. 2 is an exploded perspective view illustrating elements of the webbing take-up device illustrated in FIG. 1 configuring a pre-crash seatbelt mechanism and a lock mechanism.
Figure 3:
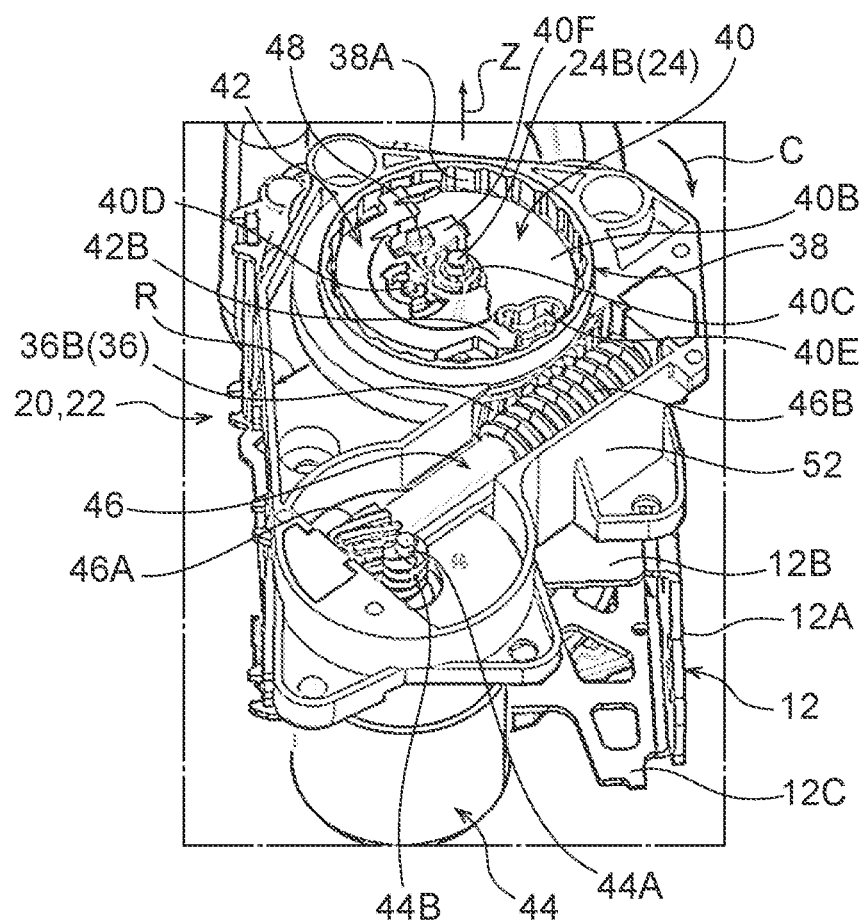
FIG. 3 is a perspective view illustrating elements of the webbing take-up device illustrated in FIG. 1 configuring the pre-crash seatbelt mechanism and the lock mechanism.

As illustrated in FIG. 2 and FIG. 3, the lock mechanism 22 and the PSB mechanism 20 include a main lock 34 serving as a lock section supported by the moving member engagement section 24, and a clutch gear 36 serving as a first rotation body that is disposed coaxially to the spool 14 and is rotatably supported by the cover base 32. The lock mechanism 22 and the PSB mechanism 20 also include a sensor holder 38 serving as a first rotation body that is attached to the clutch gear 36 so as to rotate integrally with the clutch gear 36. The lock mechanism 22 and the PSB mechanism 20 further include a V gear 40 serving as a second rotation body and second rotation main body that is rotatably supported by the moving member engagement section 24, and a W pawl 42 serving as a second rotation body and pawl that is supported by the V gear 40. The lock mechanism 22 and the PSB mechanism 20 further include a motor 44, and a shaft 46 that transmits rotation of the motor 44 to the clutch gear 36.

Figure 4:
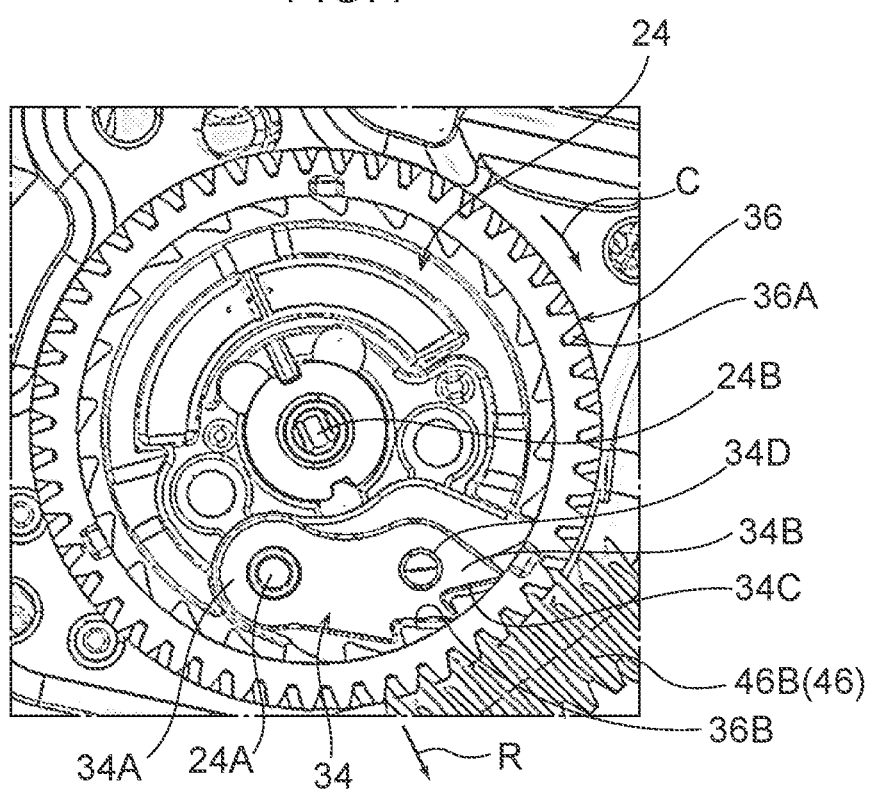
FIG. 4 is a front view illustrating elements of the webbing take-up device illustrated in FIG. 1 configuring the pre-crash seatbelt mechanism and the lock mechanism.

As illustrated in FIG. 4, the main lock 34 is formed in a substantially rectangular block shape. A base end side 34A of the main lock 34 is rotatably supported by a main lock support portion 24A provided to the moving member engagement section 24. Plural main lock engagement teeth 34C capable of engaging with the clutch gear 36 are formed at the radial direction outside of a leading end side 34B of the main lock 34. When the main lock 34 swings (is displaced) toward the radial direction outside by pivoting about the main lock support portion 24A, the main lock engagement teeth 34C engage with the clutch gear 36. A V gear engagement protrusion 34D that projects toward the one axial direction side is provided to the leading end side 34B of the main lock 34.

As illustrated in FIG. 2, the clutch gear 36 is formed in a circular tube shape. A helical gear 36A is formed around the entire circumference of an outer circumferential portion of the clutch gear 36. Plural clutch gear engagement teeth 36B with which the main lock engagement teeth 34C (see FIG. 4) of the main lock 34 engage are formed around the entire circumference of an inner circumferential portion of the clutch gear 36 on the other axial direction side (the opposite side to the arrow Z direction).

The sensor holder 38 is formed in a circular tube shape, similarly to the clutch gear 36. Plural holder engagement teeth 38A with which the W pawl 42, described later, engages are formed around the entire circumference of an inner circumferential portion of the sensor holder 38. An end portion on the other axial direction side of the sensor holder 38 is joined to an end portion on the one axial direction side of the clutch gear 36.

Figure 5:
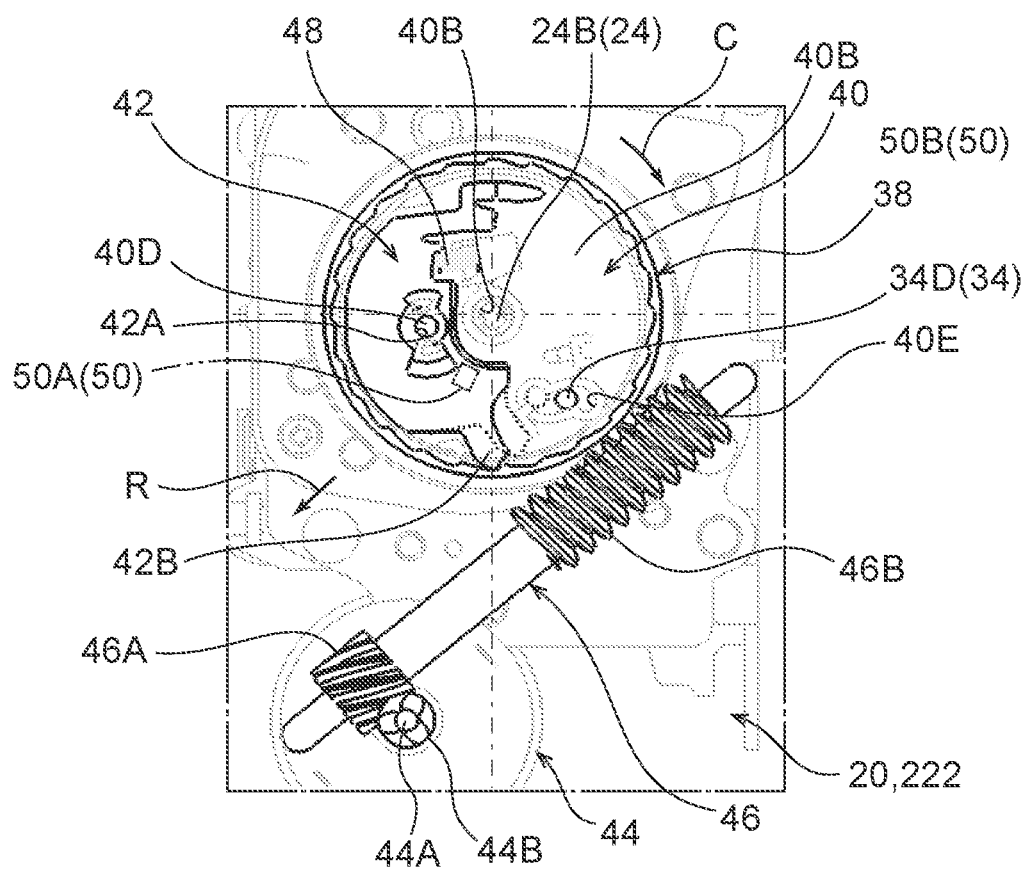
FIG. 5 is a plan view illustrating elements including a W pawl at the start of actuation of a pre-crash seatbelt mechanism.

As illustrated in FIG. 3 and FIG. 5, the V gear 40 is formed in a bottomed, substantially circular tube shape and provided at the radial direction inside of the sensor holder 38. The V gear 40 includes a tubular portion 40A (see FIG. 1) formed in a tube shape, and a circular plate portion 40B provided so as to close off one axial direction side end portion of the tubular portion 40A.

A support hole 40C is formed at a radial direction center of the circular plate portion 40B. A V gear support portion 24B provided at a rotation center of the moving member engagement section 24 is inserted through this support hole 40C. When the V gear support portion 24B of the moving member engagement section 24 has been inserted through the support hole 40C, the V gear 40 is capable of rotating by pivoting about the V gear support portion 24B.

A W pawl support portion 40D that supports the W pawl 42, described later, sticks out from the circular plate portion 40B toward the one axial direction side at the radial direction outside of the location of the circular plate portion 40B formed with the support hole 40C. A slit shaped actuation groove 40E is formed through the circular plate portion 40B at a location further to the radial direction outside than the location of the circular plate portion 40B formed with the support hole 40C and not overlapping with the W pawl 42, described later, in the axial direction. The V gear engagement protrusion 34D of the main lock 34 is disposed inside this actuation groove 40E. Note that rotation of the above-described V gear 40 is biased in the pull-out direction with respect to the moving member engagement section 24 by a non-illustrated spring provided between the V gear 40 and the moving member engagement section 24, and that V gear 40 is stopped from rotating in the pull-out direction by this spring.

The W pawl 42 is formed in a block shape that has a substantially half-moon profile as viewed along the axial direction. A support hole 42A through which the W pawl support portion 40D of the V gear 40 is inserted is formed through a circumferential direction and radial direction intermediate portion of the W pawl 42. When the W pawl support portion 40D of the V gear 40 has been inserted through the support hole 42A, the W pawl 42 is capable of swinging (displacing) by pivoting about the W pawl support portion 40D.

A spring 48 that biases the W pawl 42 is engaged with one circumferential direction side (arrow C direction side) of the W pawl 42. Note that the spring 48 is compressed between the W pawl 42 and a spring anchor portion 40F provided to the V gear 40.

A single W pawl engagement tooth 42B for engaging with the holder engagement teeth 38A of the sensor holder 38 is formed to an end portion on the other circumferential direction (the opposite side to the arrow C direction) side of the W pawl 42. When the W pawl 42 pivots about the W pawl support portion 40D of the V gear 40 so as to swing toward one side (swing such that the W pawl engagement tooth 42B side of the W pawl 42 is displaced toward the radial direction outside) against the biasing force of the spring 48, the W pawl engagement tooth 42B engages with the holder engagement teeth 38A of the sensor holder 38.

As illustrated in FIG. 5, in the present exemplary embodiment, the W pawl 42 is swung toward the one side on actuation of an electromagnetic mechanism 50. The electromagnetic mechanism 50 is configured including a permanent magnet 50A fixed to the W pawl 42, and an electromagnet 50B that generates a magnetic force to repel the permanent magnet 50A on being supplied with power. When the electromagnet 50B is supplied with power such that the electromagnet 50B generates the magnetic force to repel the permanent magnet 50A, the W pawl 42 to which the permanent magnet 50A is fixed swings toward the one side.

As illustrated in FIG. 2 and FIG. 3, the motor 44 is a DC motor provided with a rotation shaft 44A that rotates when the motor 44 is supplied with power. Note that switching the power supply to the motor 44 switches the rotation direction of the rotation shaft 44A. A motor gear 44B is fixed to the rotation shaft 44A of the motor 44. The motor 44 is fixed to a cover 52 attached to the cover base 32 in a state in which a rotation-axial direction of the rotation shaft 44A runs parallel to the rotation-axial direction of the spool 14.

The shaft 46 is supported by the cover 52 in a state in which the rotation-axial direction of the shaft 46 is orthogonal to the rotation-axial directions of the rotation shaft 44A of the motor 44 and of the spool 14. A shaft gear 46A that meshes with the motor gear 44B fixed to the rotation shaft 44A of the motor 44 is provided on the motor 44 side of the shaft 46. A worm gear 46B that meshes with the helical gear 36A provided at the outer circumferential portion of the clutch gear 36 is provided on the opposite side of the shaft 46 to the motor 44. Note that in the present exemplary embodiment, the torsion angle of the helical gear 36A formed at the outer circumferential portion of the clutch gear 36 is set such that the clutch gear 36 is rotated when rotation force of the shaft 46 is transmitted to the clutch gear 36, but the shaft 46 does not rotate when rotation force of the clutch gear 36 is transmitted to the shaft 46 (such that the helical gear 36A of the clutch gear 36 and the worm gear 46B of the shaft 46 are self-locking).

Operation and Advantageous Effects of Present Exemplary Embodiment

Next, explanation follows regarding operation and advantageous effects of the present exemplary embodiment.

As illustrated in FIG. 1, in the webbing take-up device 10 of the present exemplary embodiment, the non-illustrated webbing is pulled out from the spool 14 to be fitted over an occupant seated in a vehicle seat. When the occupant seated in the vehicle seat releases the fitted webbing, the take-up biasing mechanism 16 causes the spool 14 to rotate in the take-up direction such that the webbing is taken up onto the spool 14.

Note that as illustrated in FIG. 5, the electromagnetic mechanism 50 is actuated when a sensor or the like provided to the vehicle detects that acceleration or deceleration of the vehicle exceeding a predetermined acceleration or deceleration (i.e. in a vehicle emergency). Namely, power is supplied to the electromagnet 50B such that the electromagnet 50B generates magnetic force to repel the permanent magnet 50A. The W pawl 42 to which the permanent magnet 50A is fixed is thereby swung toward the one side, such that the W pawl engagement tooth 42B of the W pawl 42 engages with the holder engagement teeth 38A of the sensor holder 38. Since the motor 44 is unpowered when this is performed, rotation of the sensor holder 38 is restricted (rotation of the sensor holder 38 is restricted due to the self-locking of the helical gear 36A of the clutch gear 36 and the worm gear 46B of the shaft 46). Rotation of the W pawl 42 that has engaged with the sensor holder 38, and of the V gear 40 that supports the W pawl 42, is also restricted as a result.

Figure 6:
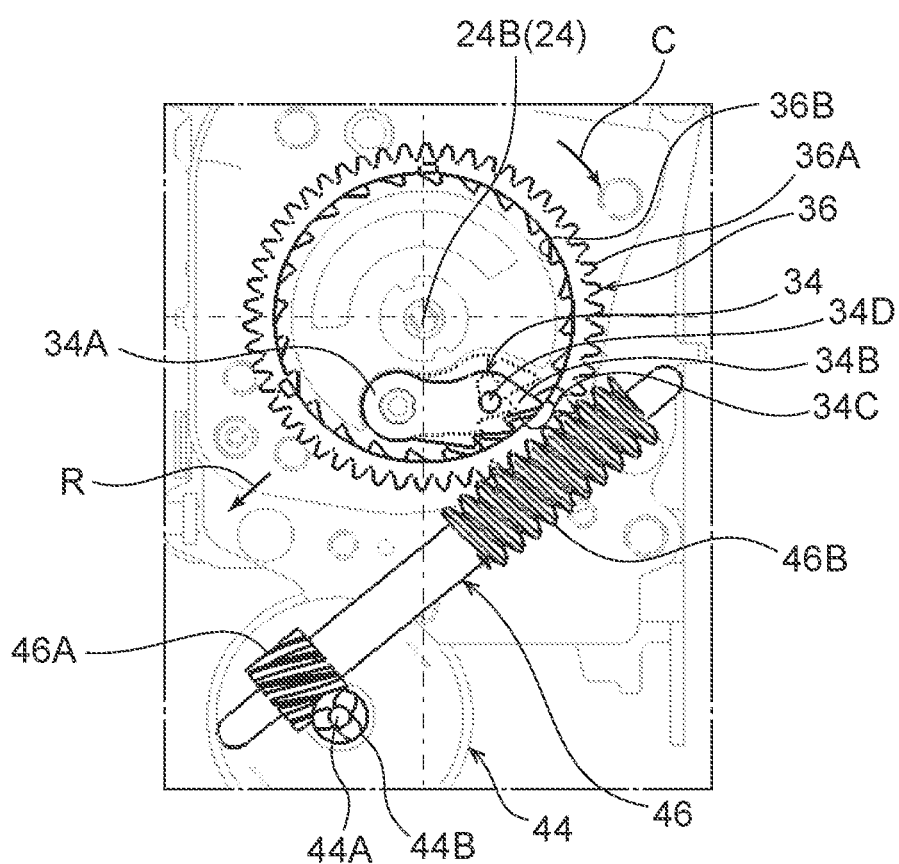
FIG. 6 is a plan view illustrating elements including a main lock at the start of actuation of a pre-crash seatbelt mechanism.

If deceleration of the vehicle then causes the body of the occupant seated in the vehicle seat to move toward a seat front side and pull the webbing out from the spool 14 (see FIG. 1), as illustrated in FIG. 5 and FIG. 6, the spool 14 is rotated in the pull-out direction together with the main lock 34. The V gear engagement protrusion 34D of the main lock 34 thereby moves along the actuation groove 40E of the V gear 40 that is restricted from rotating, such that the main lock engagement teeth 34C of the main lock 34 engage with the clutch gear engagement teeth 36B of the clutch gear 36. Rotation of the spool 14 in the pull-out direction is restricted as a result, thereby limiting pull-out of the webbing from the spool 14. The body of the occupant seated in the vehicle seat is thereby restrained by the webbing.

If a sensor or the like provided to the vehicle detects that the body of the occupant seated in the vehicle seat needs to be restrained more promptly (i.e. in a vehicle emergency), the electromagnetic mechanism 50 is actuated. The W pawl engagement tooth 42B of the W pawl 42 engages with the holder engagement teeth 38A of the sensor holder 38 as a result.

Moreover, if a sensor or the like provided to the vehicle detects that the body of the occupant seated in the vehicle seat needs to be restrained more promptly, the motor 44 is supplied with power so as to rotate toward one side. The shaft 46 is thereby rotated toward the one side, and the clutch gear 36 is rotated in the take-up direction together with the sensor holder 38. When this occurs, since the W pawl engagement tooth 42B of the W pawl 42 is engaged with the holder engagement teeth 38A of the sensor holder 38, the W pawl 42 that is engaged with the sensor holder 38 and the V gear 40 that supports the W pawl 42 are also rotated in the take-up direction. The V gear engagement protrusion 34D of the main lock 34 accordingly moves along the actuation groove 40E of the V gear 40 that is rotating in the take-up direction, and the main lock engagement teeth 34C of the main lock 34 engage with the clutch gear engagement teeth 36B of the clutch gear 36. The spool 14 is rotated in the take-up direction together with the clutch gear 36 as a result, such that the webbing is taken up onto the spool 14. This enables any slack in the webbing fitted over the body of the occupant seated in the vehicle seat to be eliminated. Moreover, in a state in which the main lock engagement teeth 34C of the main lock 34 are engaged with the clutch gear engagement teeth 36B of the clutch gear 36, rotation of the spool 14 in the pull-out direction is restricted. Thus, after eliminating slack in the webbing fitted over the body of the occupant seated in the vehicle seat, the body of the occupant seated in the vehicle seat can be restrained by the webbing without the webbing being pulled out from the spool 14.

As described above, the webbing take-up device 10 of the present exemplary embodiment enables the webbing to be taken up swiftly onto the spool 14 in a vehicle emergency, and enables the length of the taken-up webbing that is pulled out from the spool 14 to be made shorter. Moreover, relative rotation between the spool 14 and the clutch gear 36 and sensor holder 38 can be utilized to make the main lock 34 engage with the clutch gear 36.

Moreover, in the present exemplary embodiment, when the electromagnetic mechanism 50 is powered, the W pawl engagement tooth 42B of the W pawl 42 engages with the holder engagement teeth 38A of the sensor holder 38, and the main lock engagement teeth 34C of the main lock 34 engage with the clutch gear engagement teeth 36B of the clutch gear 36. This enables the main lock engagement teeth 34C of the main lock 34 to be made to engage with the clutch gear engagement teeth 36B of the clutch gear 36 more rapidly than, for example cases in which a mechanical mechanism based on friction or the like is employed to make the W pawl engagement tooth 42B of the W pawl 42 engage with the holder engagement teeth 38A of the sensor holder 38.

Furthermore, in the present exemplary embodiment, the supply of power to the electromagnetic mechanism 50 is cut off in a state in which the W pawl engagement tooth 42B of the W pawl 42 has engaged with the holder engagement teeth 38A of the sensor holder 38, and the main lock engagement teeth 34C of the main lock 34 have engaged with the clutch gear engagement teeth 36B of the clutch gear 36. This suppresses power from being supplied needlessly to the electromagnetic mechanism used to make the W pawl engagement tooth 42B of the W pawl 42 engage with the holder engagement teeth 38A of the sensor holder 38.

When a sensor or the like provided to the vehicle detects that restraint of the body of the occupant is no longer required, the motor 44 is supplied with power so as to rotate toward the other side. The shaft 46 is rotated toward the other side as a result, and the clutch gear 36 is rotated in the pull-out direction together with the sensor holder 38. The main lock 34 moves in a lock-release direction as a result, thereby releasing the engagement between the main lock engagement teeth 34C of the main lock 34 and the clutch gear engagement teeth 36B of the clutch gear 36. Pull-out of the webbing from the spool 14 is thereby permitted. Note that in the present exemplary embodiment, the engagement between the main lock engagement teeth 34C of the main lock 34 and the clutch gear engagement teeth 36B of the clutch gear 36 is released by rotating the clutch gear 36 (spool 14) in the opposite direction (pull-out direction) to the direction (take-up direction) in which the webbing is taken up onto the spool 14. Thus, after limiting pull-out of the webbing from the spool 14, the restriction on rotation of the spool 14 in the pull-out direction can then be released without further constricting the body of the occupant with the webbing.

In the present exemplary embodiment, an example has been described in which power is supplied to the electromagnetic mechanism 50 so as to make the W pawl engagement tooth 42B of the W pawl 42 engage with the holder engagement teeth 38A of the sensor holder 38, and make the main lock engagement teeth 34C of the main lock 34 engage with the clutch gear engagement teeth 36B of the clutch gear 36. However, the present invention is not limited to this configuration. For example, a configuration may be applied in which a mechanical mechanism that utilizes friction or the like is used to make the W pawl engagement tooth 42B of the W pawl 42 engage with the holder engagement teeth 38A of the sensor holder 38 and make the main lock engagement teeth 34C of the main lock 34 engage with the clutch gear engagement teeth 36B of the clutch gear 36.

Although an exemplary embodiment of the present invention has been described above, the present invention is not limited to the above description, and obviously various other modifications may be implemented within a range not departing from the spirit of the present invention.

The entire content of the disclosure of Japanese Patent Application No. 2018-181197 filed on Sep. 27, 2018 is incorporated by reference in the present specification.

The invention claimed is:

1. A webbing take-up device comprising:
a spool that is rotated in a take-up direction to take up webbing for fitting over an occupant, and that is rotated in a pull-out direction when the webbing is pulled out;
a first rotation body that is capable of transmitting rotation force; and
a lock section that is provided so as to be capable of rotating integrally with the spool, and that is capable of engaging with the first rotation body; and
a motor that is capable of rotating the first rotation body, the webbing take-up device being configured such that
in a vehicle emergency, the spool is rotated together with the lock section in the pullout direction due to the webbing being pulled out from the spool, so that the lock section is displaced to engage with the first rotation body that has been held fast so that rotation of the first rotation body is restricted, whereby rotation of the spool in the pull-out direction is restricted and the webbing is restricted from being pulled out from the spool, and
in a vehicle emergency, the first rotation body is rotated by the motor in the take-up direction of the spool, so that the lock section is displaced with respect to the first rotation body which is rotated by the motor and engages with the first rotation body such that rotation force of the first rotation body is transmitted to the spool through the lock section, whereby the spool is rotated in the take-up direction and the webbing is taken-up on the spool.

2. The webbing take-up device of claim 1, further comprising
a second rotation body that is capable of engaging with the first rotation body and at which an actuating section is provided, the lock section being capable of displacing along the actuating section,
wherein:
in a vehicle emergency, the second rotation body engages with the first rotation body whose rotation is restricted so that rotation of the second rotation body is restricted, and the spool is rotated in the pull-out direction together with the lock section with respect to the first rotation body and the second rotation body whose rotation are restricted such that the lock section is displaced along the actuating section to engage with the first rotation body, and
in a vehicle emergency, the second rotation body engages with the first rotation body and the first rotation body is rotated by the motor in the take-up direction of the spool together with the second rotation body such that the lock section is relatively displaced with respect to the first rotation body and the second rotation body which are rotated along the actuating section and engages with the first rotation body.

3. The webbing take-up device of claim 2, wherein:
the second rotation body includes a second rotation main body at which the actuating section is formed, a part of the lock section being engaged with the actuating section, and a pawl that is supported by the second rotation main body and that undergoes displacement so as to engage with the first rotation body; and the pawl is provided with part of an electromagnetic mechanism that is supplied with power in order to displace the pawl.

4. The webbing take-up device of claim 3, wherein power supply to the electromagnetic mechanism is cut off in a state in which the lock section has engaged with the first rotation body.

5. The webbing take-up device of claim 3, wherein the actuating section is a groove portion in which the part of the lock section is provided.

6. The webbing take-up device of claim 1, wherein engagement between the lock section and the first rotation body is released by rotating the first rotation body in the pull-out direction of the spool.

7. A webbing take-up device comprising:
a spool that is rotated in a take-up direction to take up webbing for fitting over an occupant, and that is rotated in a pull-out direction when the webbing is pulled out;
a first rotation body that is capable of transmitting rotation force;
a lock section that is provided so as to be capable of rotating integrally with the spool, and that is capable of engaging with the first rotation body; and
a second rotation body that is disposed at a rotation-radial direction inside of the first rotation body such that a part of the lock section engages with the second rotation body, wherein:
the first rotation body is provided so as to be capable of being rotated coaxially to a rotation axis of the spool by a motor;
the lock section is disposed at the rotation-radial direction inside of the first rotation body and is capable of undergoing displacement toward the rotation-radial direction outside of the spool;
the webbing take-up device is configured such that
in a vehicle emergency, the spool is rotated in the pull-out direction and the lock section engages with the first rotation body that has been held fast so as to restrict rotation of the spool in the pull-out direction, the second rotation body engages with the first rotation body and the spool is rotated in the pull-out direction with respect to the second rotation body such that the lock section is displaced toward the rotation radial direction outside of the spool and engages with the first rotation body so as to restrict rotation of the spool in the pull-out direction; and
in a vehicle emergency, the first rotation body is rotated in the take-up direction of the spool and the lock section engages with the first rotation body such that rotation force of the first rotation body is transmitted to the spool through the lock section and the spool is rotated in the take-up direction, the second rotation body engages with the first rotation body and the first rotation body is rotated in the take-up direction of the spool together with the second rotation body such that the lock section is displaced toward the rotation-radial direction outside of the spool and engages with the first rotation body such that rotation force of the first rotation body is transmitted to the spool through the lock section and the spool is rotated in the take-up direction.

8. The webbing take-up device of claim 7, wherein:
the second rotation body includes a second rotation main body engaged with the part of the lock section, and a pawl that is supported by the second rotation main body and that undergoes displacement so as to engage with the first rotation body; and the pawl is provided with part of an electromagnetic mechanism that is supplied with power in order to displace the pawl.

9. The webbing take-up device of claim 8, wherein power supply to the electromagnetic mechanism is cut off in a state in which the lock section has engaged with the first rotation body.

10. The webbing take-up device of claim 9, wherein engagement between the lock section and the first rotation body is released by rotating the first rotation body in the pull-out direction of the spool.

\* \* \* \* \*